United States Patent
Ha et al.

(10) Patent No.: US 11,724,705 B2
(45) Date of Patent: Aug. 15, 2023

(54) METHOD AND APPARATUS FOR OPERATING MOVING OBJECT BASED ON EDGE COMPUTING

(71) Applicants: HYUNDAI MOTOR COMPANY, Seoul (KR); KIA MOTORS CORPORATION, Seoul (KR)

(72) Inventors: Jae Jun Ha, Gyeonggi-do (KR); Young Jun Moon, Sejong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 452 days.

(21) Appl. No.: 16/851,688

(22) Filed: Apr. 17, 2020

(65) Prior Publication Data
US 2020/0361477 A1 Nov. 19, 2020

(30) Foreign Application Priority Data
May 15, 2019 (KR) .......................... 10-2019-0056921

(51) Int. Cl.
*H04W 4/44* (2018.01)
*B60W 50/00* (2006.01)
(Continued)

(52) U.S. Cl.
CPC ............ *B60W 50/00* (2013.01); *G01C 21/30* (2013.01); *G07C 5/008* (2013.01); *G07C 5/08* (2013.01); *H04L 67/125* (2013.01); *H04W 4/44* (2018.02); *H04W 8/26* (2013.01); *H04W 76/15* (2018.02); *B60W 2556/45* (2020.02)

(58) Field of Classification Search
CPC ... B60W 50/00; B60W 2556/45; G01C 21/30; G01C 21/3885; G07C 5/008; G07C 5/08; H04L 67/125; H04L 67/12; H04L 29/06; H04L 45/00; H04L 29/06027; H04L 12/66; H04L 47/10; H04W 4/44; H04W 8/26; H04W 76/15; H04W 12/43; H04W 12/45; H04W 12/06; H04W 8/24; H04W 8/183; H04W 4/40; H04W 4/029; H04W 8/18; H04W 12/40; H04W 88/06; B60R 16/023; B60R 16/037
See application file for complete search history.

(56) References Cited

U.S. PATENT DOCUMENTS 9,083,581 B1    7/2015  Addepalli et al.
9,712,452 B2 *  7/2017  Walke ..................... H04W 4/50
(Continued)

FOREIGN PATENT DOCUMENTS

| CN | 102131297 A * | 7/2011 | ............ H04W 72/10 |
| RU | 2487418 C1 * | 7/2013 | ............ H04W 4/44 |
| WO | WO-2012174722 A1 * | 12/2012 | ............ H04W 8/183 |

*Primary Examiner* — Phuongchau Ba Nguyen
(74) *Attorney, Agent, or Firm* — Fox Rothschild LLP

(57) ABSTRACT

A method of operating a moving object having a plurality of identity devices is provided. The method includes generating data in the moving object, transmitting first data of a plurality of data to a first node through a first identity device of the moving object and transmitting second data of the plurality of data to a second node through a second identity device of the moving object, receiving the first data from the first node and receiving the second data from the second node, and operating the moving object based on the first data and the second data.

20 Claims, 21 Drawing Sheets

(51) Int. Cl.
*H04W 76/15* (2018.01)
*G01C 21/30* (2006.01)
*G07C 5/00* (2006.01)
*G07C 5/08* (2006.01)
*H04L 67/125* (2022.01)
*H04W 8/26* (2009.01)

(56) References Cited

U.S. PATENT DOCUMENTS

| | | | |
|---|---|---|---|
| 9,775,082 B1* | 9/2017 | Chakraborty | H04W 76/15 |
| 2010/0075655 A1* | 3/2010 | Howarter | H04M 1/72415 |
| | | | 455/420 |
| 2010/0222063 A1* | 9/2010 | Ishikura | H04L 1/04 |
| | | | 455/450 |
| 2013/0162421 A1* | 6/2013 | Inaguma | H04M 1/72412 |
| | | | 340/438 |
| 2014/0189814 A1 | 7/2014 | Marten et al. | |
| 2014/0200765 A1 | 7/2014 | Waeller | |
| 2015/0029987 A1* | 1/2015 | Addepalli | G06F 3/017 |
| | | | 370/329 |
| 2015/0099562 A1* | 4/2015 | Xiong | H04W 12/04 |
| | | | 455/558 |
| 2015/0112512 A1* | 4/2015 | Fan | B60G 17/02 |
| | | | 701/1 |
| 2015/0135336 A1* | 5/2015 | Arasavelli | H04L 63/102 |
| | | | 726/29 |
| 2015/0215773 A1* | 7/2015 | Bai | H04W 8/04 |
| | | | 455/418 |
| 2017/0170856 A1* | 6/2017 | Shen | H04M 15/765 |
| 2017/0371349 A1 | 12/2017 | Kim et al. | |
| 2018/0041893 A1* | 2/2018 | Guo | H04W 8/02 |
| 2019/0045354 A1* | 2/2019 | Polehn | H04B 1/3816 |
| 2020/0008049 A1* | 1/2020 | Namiranian | H04W 12/0433 |
| 2020/0068414 A1* | 2/2020 | Karimli | H04J 3/0647 |
| 2020/0296572 A1* | 9/2020 | Bachmutsky | H04W 12/61 |
| 2022/0141919 A1* | 5/2022 | Lee | H04L 65/1016 |
| | | | 455/552.1 |

* cited by examiner

METHOD AND APPARATUS FOR OPERATING MOVING OBJECT BASED ON EDGE COMPUTING

CROSS-REFERENCE TO RELATED APPLICATION

The present application claims priority to and the benefit of Korean Patent Application No. 10-2019-0056921 filed on May 15, 2019, which is incorporated herein by this reference in its entirety.

TECHNICAL FIELD

The present disclosure relates to a method of operating a moving object based on edge computing, and, more particularly, to a method and apparatus for operating a moving object through an identity device based on edge computing.

BACKGROUND

The statements in this section merely provide background information related to the present disclosure and may not constitute prior art.

Subscriber identity modules (SIMs) are used in smart devices or smartphones. In addition, universal subscriber identity module (USIM) technology is an evolution of a SIM card and may be a step up from the SIM used in a global system for mobile communications (GSM). At this time, the USIM may be a small chip essentially inserted into a third-generation mobile communication (WCDMA) terminal capable of video calling. The USIM includes a small CPU and a memory. The CPU may identify a user using an encryption/decryption function and the memory may be used as a storage space for additional services. The USIM has been used in various forms. Such a SIM card is applicable to a moving object, which will be described below.

SUMMARY

The present disclosure provides a method and apparatus for operating a moving object based on edge computing.

The present disclosure also provides a method and apparatus for operating a moving object through an identity device based on edge computing.

The present disclosure also provides a method and apparatus for performing edge computing in a moving object based on a plurality of identity devices.

In some forms of the present disclosure, a method of operating a moving object, to which an identity device is applied, includes generating data in the moving object, transmitting first data of the data to a first node through a first identity device of the moving object and transmitting second data of the data to a second node through a second identity device of the moving object, receiving first data processed in the first node from the first node and receiving second data processed in the second node from the second node, and operating the moving object based on the processed first data and the processed second data.

In some forms of the present disclosure, a moving object operating by applying an identity device includes a transceiver configured to transmit and receive a signal and a processor configured to control the transceiver. The processor is configured to detect generation of data, transmit first data of the data to a first node through a first identity device of the moving object and transmit second data of the data to a second node through a second identity device of the moving object, receive first data processed in the first node from the first node and receive second data processed in the second node from the second node, and perform operation based on the processed first data and the processed second data.

In some forms of the present disclosure, a n edge computing system includes a moving object and a plurality of nodes. The moving object detects generation of data, the moving object transmits first data of the data to a first node through a first identity device of the moving object and transmits second data of the data to a second node through a second identity device of the moving object, the moving object receives first data processed in the first node from the first node and receives second data processed in the second node from the second node, and the moving object performs operation based on the processed first data and the processed second data.

In addition, the following matters are commonly applicable to the method of operating the moving object, the moving object and the system.

In some forms of the present disclosure, data generated before a first point of time among the data may be the first data, and data generated after the first point of time among the data may be the second data.

In some forms of the present disclosure, data generated based on a first period among the data may be the first data, and data generated based on a second period among the data may be the second data.

In some forms of the present disclosure, data processed via a first network among the data may be the first data, and data processed via a second network among the data may be the second data.

In some forms of the present disclosure, security-related data among the data may be the first data, and security-unrelated data among the data may be the second data.

In some forms of the present disclosure, when the moving object operates based on the processed first data and the processed second data, the moving object may change at least one of setting information or status information of the moving object.

In some forms of the present disclosure, the setting information or the status information may include at least one of a position of a driver's seat, a height of the driver's seat, a color of an interior lighting, brightness of the interior lighting, a position of a room mirror, an angle of the room mirror, a position of a side-view mirror, an angle of the side-view mirror, an inside temperature, an angle of a steering wheel, tire pressure, an autonomous driving function setting variable, a transmission setting mode, a dashboard mode, navigation settings, content settings, or a wireless communication connection mode.

In some forms of the present disclosure, when the first data is data on navigation of the moving object, the first node may determine whether a traveling route of the moving object is consistent based on prestored map information.

In some forms of the present disclosure, when the first node determines that the traveling route of the moving object is consistent based on the prestored map information, a response message may not be transmitted to the moving object, and, when the first node determines that the traveling route of the moving object is not consistent based on the prestored map information, a response message for inconsistency may be transmitted to the moving object as the first data processed in the first node.

In some forms of the present disclosure, each of the first identity device and the second identity device may include unique identification information.

In some forms of the present disclosure, the first node may be determined based on the unique identification information included in the first identity device, and the second node may be determined based on the unique identification information included in the second identity device.

In some forms of the present disclosure, the first node may be a first base station and the second node is a second base station, and each of the first base station and the second base station may directly process the received data.

In some forms of the present disclosure, registration and management of the moving object, the first base station and the second base station may be performed via a cloud.

In some forms of the present disclosure, the first node may be a base station and the second node may be another moving object, the unique identification information of the first identity device may be identification information of a type indicating the base station, and wherein the unique identification information of the second identity device may be identification information of a type indicating the moving object.

In some forms of the present disclosure, the first identity device may be an installed identity device, and the second identity device may be an embedded identity device.

In some forms of the present disclosure, two or more identity devices may be installed in the moving object.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
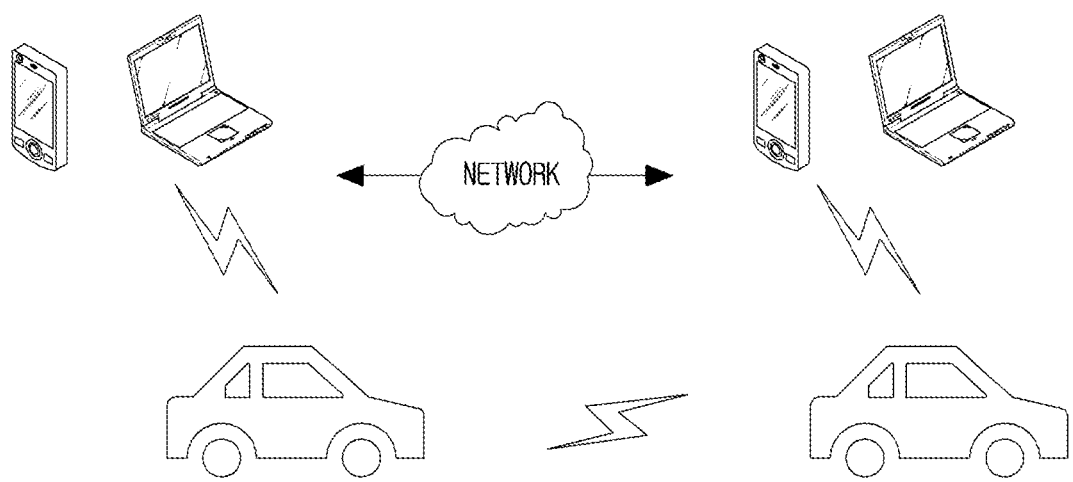
FIG. 1 is a view showing a method of performing communication between a moving object and other devices.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In describing some forms of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in one form of the present disclosure could be termed a second element in another form of the present disclosure, and, similarly, a second element in one form of the present disclosure could be termed a first element in another form of the present disclosure, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed forms are included in the scope of the present disclosure.

FIG. 1 is a view showing a method of, at a moving object, performing communication with another moving object or a device via a network. Referring to FIG. 1, the moving object may perform communication with another moving object or another device. For example, the moving object may perform communication with another moving object or another device based on cellular communication, WAVE communication, DSRC (Dedicated Short Range Communication) or other communication schemes. That is, as a cellular communication network, an LTE or 5G communication network, a Wi-Fi communication network, a WAVE communication network, etc. may be used. In addition, a short-range communication network used in a moving object, such as DSRC, may be used, without being limited to the above-described forms of the present disclosure.

In addition, for example, in relation to communication of the moving object, a module for performing communication only with a device located inside the moving object and a module capable of performing communication with a device located outside the moving object may be separately provided, for security of the moving object. For example, communication with a device in a certain range of the moving object, such as Wi-Fi communication, may be performed inside the mobile terminal, for security. For example, the moving object and a device privately owned by the driver of the moving object may include respective communication modules for performing only communication with each other. That is, the moving object and the device privately owned by the driver of the moving object may use a communication network disconnected from an external communication network. In addition, for example, the moving object may include a communication module for performing with an external device. In addition, for example, the module may be implemented as one module. That is, the moving object may perform communication with another device based on one module, without being limited to the above-described form of the present disclosure. That is, in the moving object, the communication method may be implemented based on various methods, without being limited thereto the above-described form of the present disclosure.

At this case, for example, the moving object may refer to a movable device. For example, the moving object may include a vehicle (including an autonomous vehicle and an automated vehicle), a drone, a mobility, a mobile office, a mobile hotel, or a personal air vehicle (PAV). In addition, the moving object may include the other movable devices, without being limited to the above-described forms of the present disclosure.

FIGS. 2A, 2B, 2C, and 2D are views showing a method of applying an identity device to a moving object.

For example, the identity device may have at least one of functions for identifying at least one of a user, an object to be controlled or a service object. In addition, for example, the identity device may have an ID function. In addition, for example, the identity device may include at least one of a smart device, a smart module, a user identification module or an identification module. That is, the identity device may be a hardware element. In addition, for example, the identity device may be a software element and may be used for identification. For example, the identity device may be a subscriber identity module (SIM). For example, the SIM applied to the moving object as the identity device may be at least one of a Mobility SIM (M-SIM) or a Vehicle SIM (V-SIM). In addition, for example, the identity device may be equal to or compatible with an existing SIM, without being limited to the above-described form of the present disclosure. Although the identity device is focused upon in the following description, this may be replaced by a smart module, a user module, a SIM, etc., without being limited thereto. However, for convenience of description, the identity device will be focused upon in the following description. As described above, the identity device may be applied to the moving object in consideration of the case where the moving object performs communication with an external device. For example, a smartphone may include a universal subscriber identity module (USIM), which is used to recognize the user of the smartphone to provide a service. For example, when an apparatus is compatible with the same brand or the identity device, only the identity device of the user may be changed to identify the user of the apparatus and a service may be provided based on the same. The moving object may also include an identity device card embedded therein, based on the above description. For example, the identity device applied to the moving object may be referred to as a vehicle SIM (VSIM). That is, a new type of identity device may be applied as the identity device applied to the moving object. For example, the VSIM may be compatible with a USIM or another SIM. In addition, the VSIM may further provide other services in consideration of the characteristics of the moving object, without being limited to the above-described form of the present disclosure. In addition, an identity device card applied to the moving object may be provided and may be referred to as another name, without being limited to the above-described form of the present disclosure.

Figure 2A:
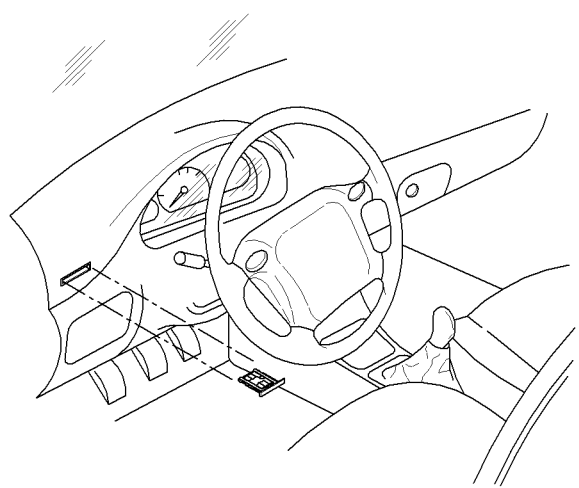
FIGS. 2A, 2B, 2C and 2D are views showing a method of applying an identity device to a moving object.
Figure 2B:
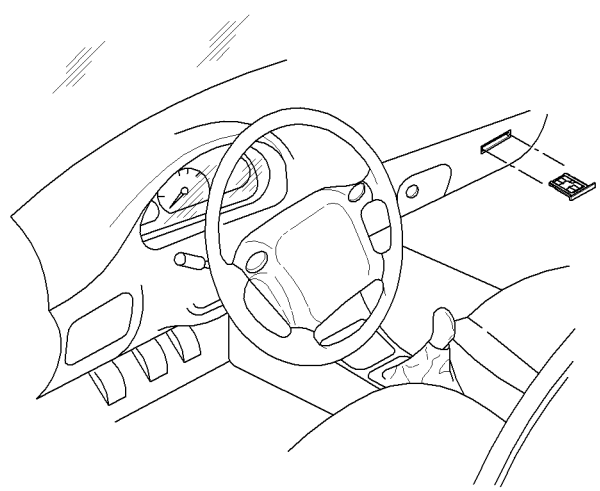

For example, as shown in FIG. 2A, to which the identity device is applied, may be located in a part, which is capable of being visually identified, of the driver's seat of the moving object. As another example, as shown in FIG. 2B, the identity device may be applied to the inside of the glove box of the passenger seat of the moving object. As another example, the identity device may be inserted into a part in which the display of the moving object is located, without being limited to the above-described form of the present disclosure.

Figure 2C:
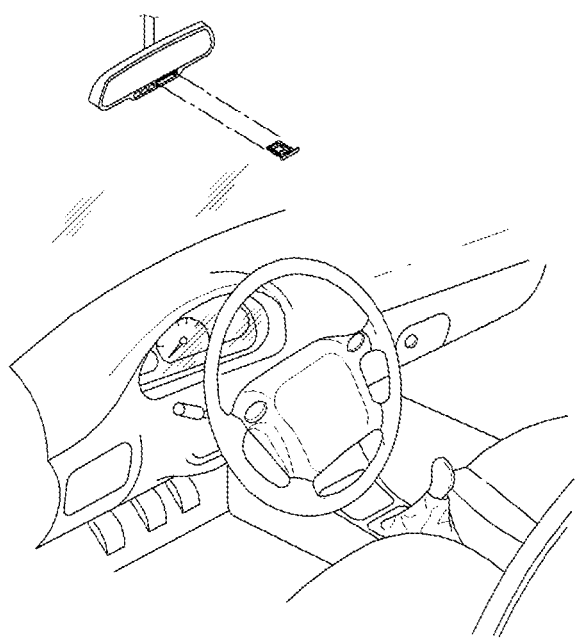
Figure 2D:
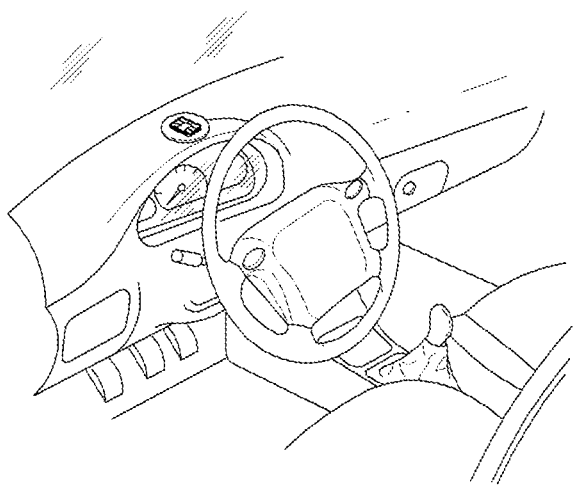

As another example, as shown in FIG. 2C, the identity device may be installed in a room mirror of the moving object. For example, since the room mirror of the moving object is easily accessible to the passenger while affecting traveling of the moving object or the other devices of the moving object, the identity device may be installed in the room mirror of the moving object. As another example, as shown in FIG. 2D, the identity device may be installed in a cradle or a pad. For example, when the moving object is controlled by the identity device, a large number of cases of replacing the identity device for each user may occur. In view of the foregoing, in order to enhance convenience of installing the identity device, the identity device may be installed in the cradle or the pad and used to control the moving object. For example, the identity device may be installed in the cradle or the pad based on the magnetic properties. In addition, for example, the identity device may be installed in the cradle or the pad based on another manner, without being limited to the above-described form of the present disclosure.

As another example, the identity device may be implemented in combination with a tool key or a car key in consideration of the portability of the identify device. That is, the identity device may be installed in the tool key or the car key, the identity device detached from the car key may be used in a state of being installed in the moving object. For example, a USIM or an identity device similar thereto may have a small size. In addition, the identity device has a portion which is in contact with the moving object and thus there is a need for preventing damage to the contact portion. In view of the foregoing, the identity device may be coupled to the car key or the tool key. As another example, the car key or the tool key itself may be an identity device. That is, each user may own their car key or tool key as the identity device, and may control the moving object using the same. For example, when the car key or the tool key is an identity device, the car key or the tool key may be installed in the moving object. In addition, for example, the car key or the tool key may perform communication with the moving object via short-range communication (e.g., Bluetooth, beacon or NFC), thereby performing message exchange or identification. That is, the car key or the tool key, to which the uniqueness of an individual is applied, may be used as the identity device, without being limited to the above-described form of the present disclosure.

As another example, the identity device may be installed through an existing device installed in the moving object. For example, an existing device (e.g., a hi-pass terminal or a black box) may be already installed in the moving object. At this time, if a separate installation portion is configured in the moving object in order to install the identity device, since equipment for the moving object needs to be changed and a component or part for additional installation may be necessary, the existing device may be used in order to install the identity device. That is, a component in which the identity device may be installed may be added to the existing device already installed in the moving object and the identity device may be installed in the component based on the same. As another example, the identity device may be recognized through an existing terminal (e.g., a USB port, or a cigar jack) included in the moving object.

As another example, the identity device may be applied at any position in an authenticable range of the moving object, and the identity device may be applied integrally with or independently of a control unit, a communication unit or a configuration part of the moving object.

More specifically, the moving object may include a separate installation portion for installation of the identity device or a part in which the identity device is installed. That is, the identity device may be installed in the moving object in a state of being separated from the other parts, as one independent part. As another example, the identity device may be installed in the moving object to be included in at least one of the control unit, the communication unit or the other unit, as described above. For example, in the moving object, the control unit or the communication unit may perform communication with an external device or control information. At this time, the identity device may provide necessary information to the control unit and the communication unit or enable the control unit and the communication unit to operate through identification and authentication. That is, the identity device may be closely related to the control unit or the communication unit and thus may be installed in the moving object in combination with the above-described units. That is, the identity device may be installed in the moving object integrally with the other units. As another example, the identity device may be implemented as an identity device embedded in the moving object. The embedded identity device may be physically implemented in the moving object or may be implemented in software in the moving object operation and design process, without being limited to the above-described form of the present disclosure.

In addition, for example, all a plurality of identity devices implemented in the moving object may be embedded identity devices. More specifically, the plurality of identity devices is not installed through a separate installation unit but may be embedded identity devices implemented in the moving object in hardware or software. For example, the plurality of embedded identity devices may be implemented for each user. In addition, for example, the plurality of embedded identity devices may be used to separate each system in the moving object, without being limited to the above-described form of the present disclosure. That is, the plurality of identity devices may be implemented in the moving object in the form of embedded identity devices. In addition, detailed operation based on the above description will be described below.

For example, the equipment of the moving object is changed or an additional component is installed in order to install the identity device, cost may increase. In view of the foregoing, the identity device may be installed (or recognized) through an existing terminal included in the moving object. Therefore, the identity device may be easily applied to the existing moving object, without being limited to the above-described form of the present disclosure.

At this time, when the identity device is applied to the moving object, the moving object may perform subscriber identification based on the identity device. That is, similarly to a smartphone, the moving object may identify the user of the moving object based on the identity device. At this time, the identity device may include user environment information such as driving record information of a user, navigation setting information, moving object setting information, driver's seat information, steering information. That is, by applying the identity device to the moving object, it is possible to establish a system based on information on use of the moving object. In addition, for example, when the identity device is not applied to the moving object, operation may be impossible. For example, the moving object may operate only when the identity device is applied and recognized. However, for example, some driving may be possible in consideration of emergency.

For example, as described above, when the identity device is not identified and authenticated in the moving object, the control authority of the moving object may not be granted. For example, in the case where the moving object is a vehicle, in the past, the vehicle may be immediately controlled when the vehicle is turned on. However, when the identity device is applied, the vehicle may be controlled only when the vehicle is turned on and identification and authentication of the identity device is completed. More specifically, the moving object may operate based on full autonomous driving. In addition, for example, the moving object may perform communication with other devices via a communication network and operate based on information received through communication. However, in the moving object, since a plurality of operations and functions may be defined for the purpose of movement, when identification and authentication are not guaranteed, a security problem or a risk of an accident may occur. In view of the foregoing, the moving object may be turned on differently from the existing method and may be controlled when identification and authentication are performed based on the identity device.

As another example, the identity device may operate regardless of whether the moving object is turned on. For example, the moving object may include devices for supplying power to the other existing devices, such as a black box. At this time, the identity device may operate by receiving power from the moving object. As another example, the identity device may provide power and operate by itself. In addition, for example, the identity device may supply power and operate based on a separate charging device such as wireless charging or solar charging. At this time, the operation of the identity device may not require large power consumption and may operate regardless of whether the moving object is turned on. The identity device may operate by receiving power from the moving object or by supplying power by itself. That is, the identity device may operate regardless of whether the moving object is turned on, without being limited to the above-described form of the present disclosure. At this time, for example, even when the moving object is turned on, the identity device may perform identification and authentication. For example, in order to trigger the identity device when the moving object is not turned on, identification and authentication may be performed when the personal device of the owner of the moving object is recognized. As another example, even if the moving object is not turned on, identification and authentication of the identity device may be performed when it is recognized that the driver or another user rides in the moving object, without being limited to the above-described form of the present disclosure. That is, even if the moving object is not turned on, the identity device may operate, without being limited to the above-described form of the present disclosure.

At this time, in view of the foregoing, it is possible to prevent the identity device from being arbitrarily removed from the moving object. More specifically, as described above, the risk of security and accidents may be high in the case of the moving object. In addition, as described above, when the identity device is arbitrarily detached while operation is performed based on the identity device, the risk of accidents may occur based on authentication error. In view of the foregoing, it is possible to prevent the identity device from being arbitrarily detached. For example, before the moving object is turned on, the identity device may be arbitrarily attached and detached. That is, when the moving object does not operate, attachment/detachment of the identity device may not be locked. Accordingly, a user who wants to use the moving object may replace the identity device before the moving object is turned on, and use an identity device suitable for the user.

Figure 3A:
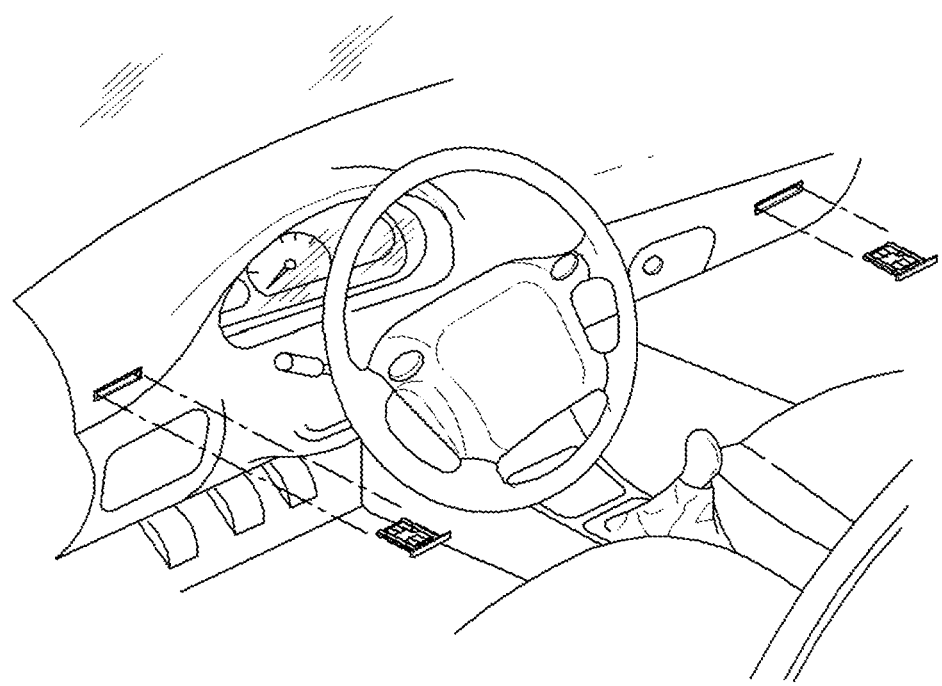
FIGS. 3A, 3B and 3C are views showing a method of installing a plurality of identity devices in a moving object.
Figure 3B:
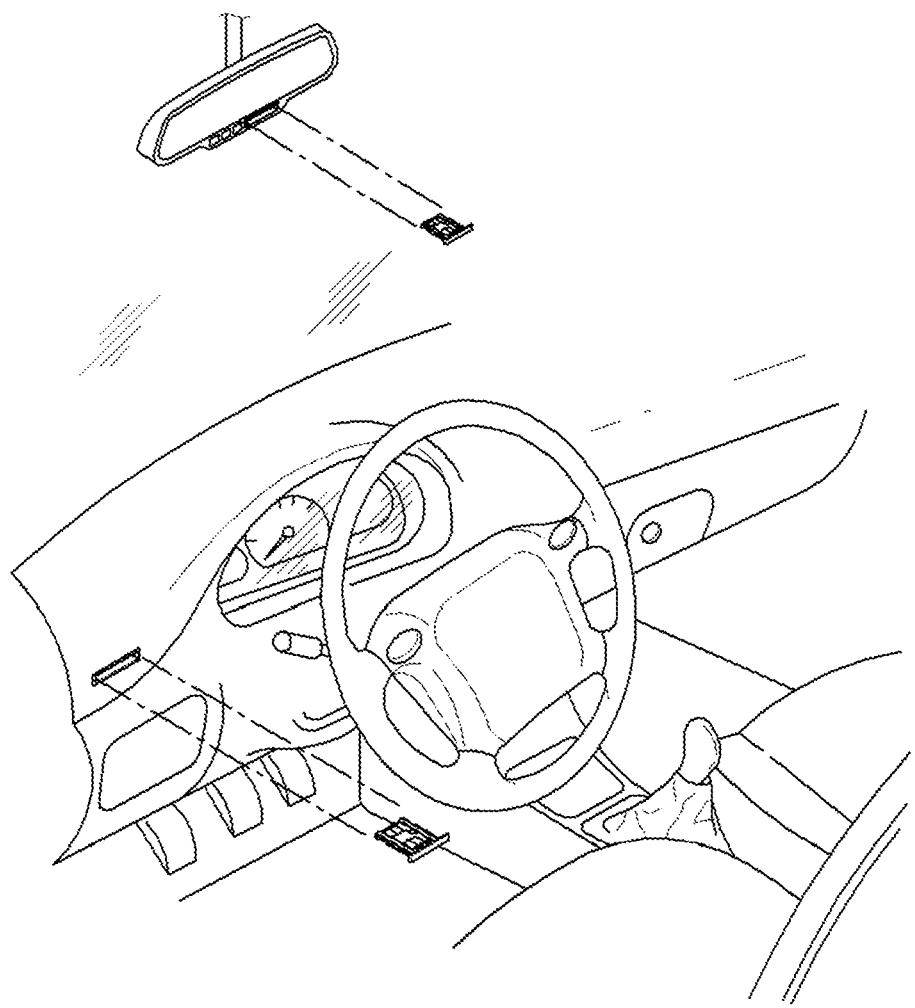

In addition, for example, referring to FIGS. 3A and 3B, the plurality of identity devices may be installed in the moving object based on respective positions. At this time, for example, the positions at which the plurality of identity devices is installed may be variously set, and the installation positions are not limited to FIGS. 3A and 3B. That is, the plurality of identity devices may be installed in the moving object to perform individual identification and authentication, which will be described below.

Figure 3C:
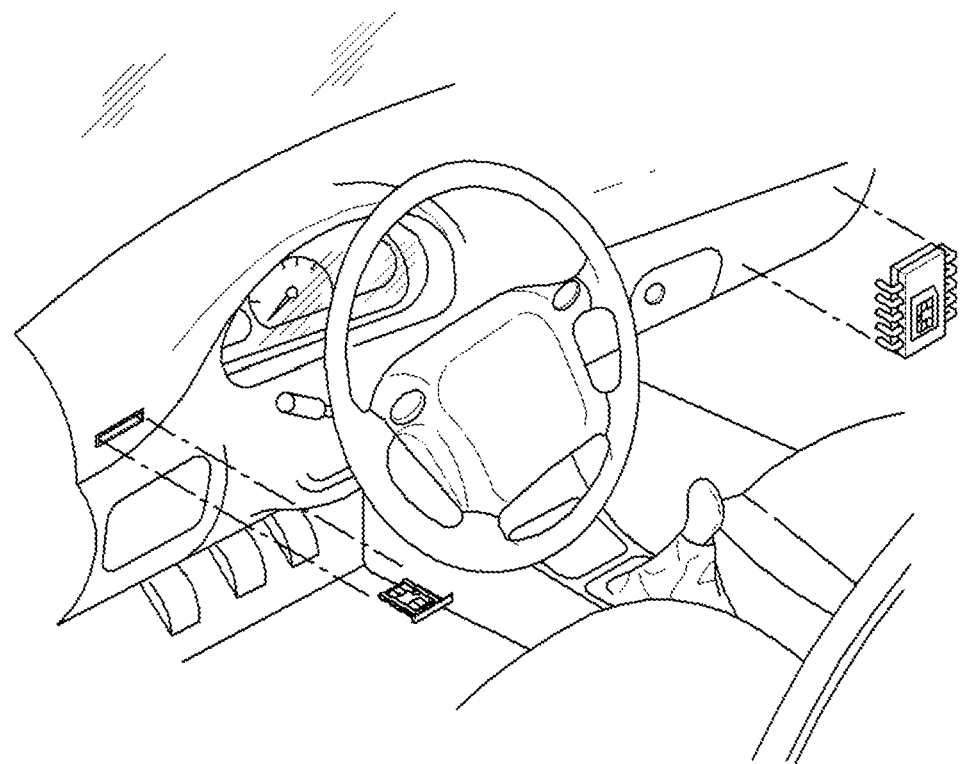

In addition, for example, as shown in FIG. 3C, some of the plurality of identity devices may be embedded and the other identity devices may be installed. At this time, the embedded identity device is implemented physically or in software in the moving object. For example, the embedded identity device may be the above-described embedded SIM. That is, the embedded identity device may include an identity device implemented inside the moving object, without being limited thereto. When the plurality of identity devices is applied to the moving object, the identity device may be installed or implemented in the moving object in various ways, without being limited to the above-described form of the present disclosure.

For example, each identity device may perform identification and authentication with respect to a user corresponding thereto. More specifically, the moving object may be used by a plurality of users unlike the existing smart devices. At this time, the moving object includes autonomous driving or user-specific functions, which need to be used by identifying each user. In view of the foregoing, the plurality of identity devices may be installed (or implemented) in the moving object. Therefore, the moving object may recognize a plurality of users.

As a more specific example, the moving object may be driven (or may travel) in a state in which the plurality of identity devices is installed. For example, the moving object may be provided with two identity devices as shown in FIGS. 3A, 3B and 3C or may be provided with greater than two identity devices. In addition, for example, as many identity devices as the number of users who use the moving object may be installed. At this time, in the case of performing initial setting on the moving object, the number of users may be checked and, based on the same, the identity device may be installed in the moving object. For example, while the moving object is used, the identity device may be additionally installed to add a user. As described above, when the plurality of identity devices is installed based on the user who uses the moving object, it is possible to prevent the moving object from being illegally used or stolen by an unauthorized user.

As another example, as described above, an autonomous driving function or a user-specific function may be set in the moving object. For example, preferred moving object settings may differ between users. In addition, environments in which the moving object is used may differ between users. At this time, in consideration of this, it is necessary to manually change settings in the current moving object. In addition, for example, the autonomous driving function may be set differently for each user. For example, autonomous driving may be set to a full autonomous mode or a partial autonomous driving mode based on the skill of the user. In addition, for example, the autonomous driving mode may be set differently based on the age or driving experience of the user. That is, the autonomous driving mode may be set differently for each user who uses the moving object, without being limited to the above-described form of the present disclosure.

As described above, when a plurality of users uses the moving object, the moving object needs to be used distinguishably for each user and thus a plurality of identity devices may be provided.

For example, when the moving object is used, the moving object may perform identification and authentication with respect to the user and operate based on the identity device of the user. At this time, for example, the user may be identified and authenticated through a camera included in the moving object. As another example, the user may be identified and authenticated based on fingerprint identification or a separate authentication key. That is, each user may register their fingerprint or may be assigned a separate authentication key (e.g., a password) and then may be identified and authenticated through the fingerprint or the separate authentication key when using the moving object. As another example, identification and authentication of the user may be performed through at least one of fingerprint recognition, iris recognition, facial recognition, moving object head unit input, FOB key, electronic key, Internet advance reservation, another device, a server or a mobile device. That is, the moving object may identify and authenticate each user, without being limited to the above-described form of the present disclosure. In addition, for example, when the identity device is installed, the moving object may identify and authenticate a user based on information stored in the identity device. That is, when the identity device is installed without additional identification and authentication, the moving object may identify and authenticate a user corresponding to the identity device and operate based on this.

At this time, as another example, operation of installing an identity device may be restricted in order to prevent an unauthorized identity device from being installed in the moving object without permission. More specifically, the moving object may perform authentication based on wireless communication with the identity device or the device of the user who uses the identity device. That is, authentication for allowing installation of the identity device may be performed before the identity device is installed, thereby preventing the identity device from being installed without permission. For example, the identity device installation unit of the moving object may not be opened until authentication and may be opened when installation is allowed through pre-authentication using the identity device itself or the device of the user. At this time, the moving object may identify and authenticate the user by only installing the identity device, and operate based on this, without being limited to the above-described form of the present disclosure.

At this time, when the moving object identifies and authenticates the user, the moving object may operate based on the identity device corresponding to the identified and authenticated user. For example, the moving object may store and update information on use or driving of the moving object in the identity device based on the user. In addition, for example, setting information for the user may be stored in the identity device. At this time, when the moving object recognizes the user, the setting of the moving object may be changed based on the setting information included in the identity device.

In addition, for example, the moving object may operate based on edge computing. At this time, edge computing may refer to a method of performing data processing through an apparatus itself or a neighbor device without transmitting data to a data center (or a cloud or a server). For example, it is possible to improve data processing efficiency through edge computing. As another example, it is possible to increase security for data processing based on distributed processing, without being limited to the above-described form of the present disclosure.

Figure 4A:
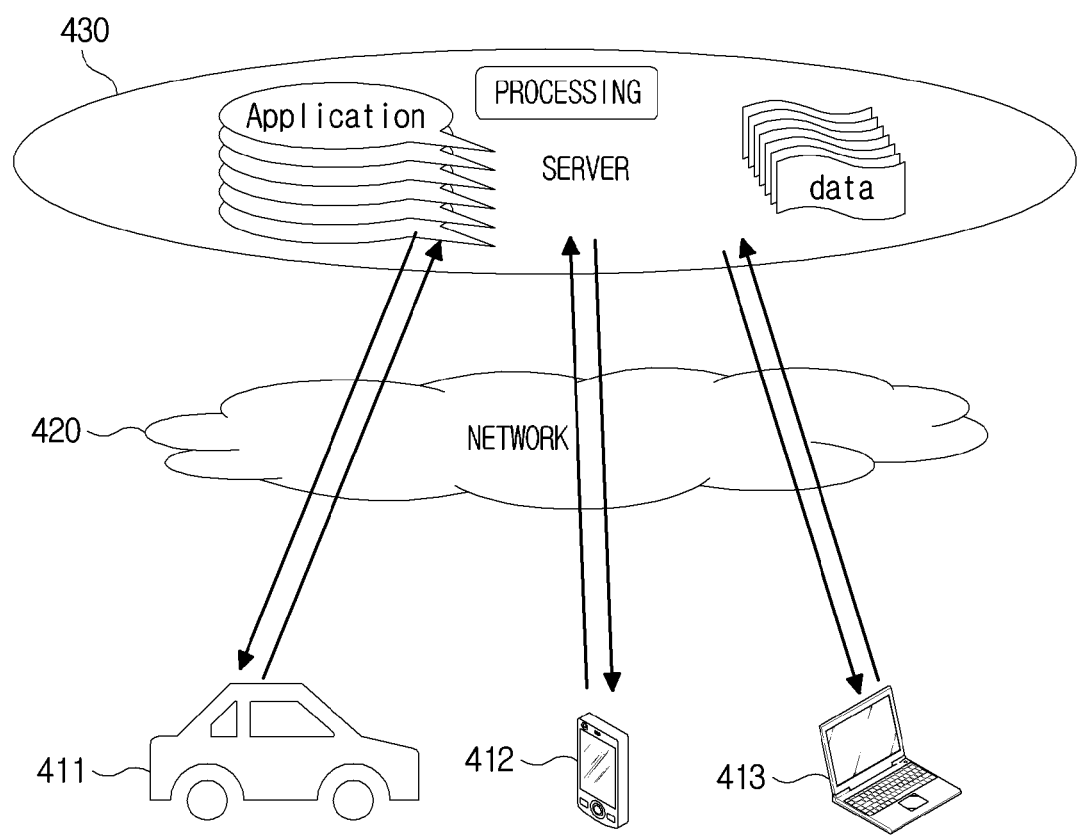
FIGS. 4A and 4B are views showing a data processing method.

More specifically, referring to FIG. 4A, data may be processed based on an existing data center. For example, when data is processed through the data center (or the cloud or the server) 430, devices (e.g., a moving object, a mobile device and a computer) 411, 412 and 413 may transmit data to be processed to the data center 430 via a network 420. At this time, the data center 430 may process the received data using an application, etc. and acquire a result of processing. That is, the data center 430 may perform data processing with respect to the transmitted data. Thereafter, the data center 430 may transmit the result of data processing to the devices 411, 412 and 413 again via the network 420. That is, data of the devices 411, 412 and 413 may be processed in a centralized manner. However, in the above-described case, since the data center 430 performs processing with respect to a plurality of devices, delay may occur in data processing. In addition, since data itself is transmitted to the data center 430, this may be vulnerable to security.

Figure 4B:
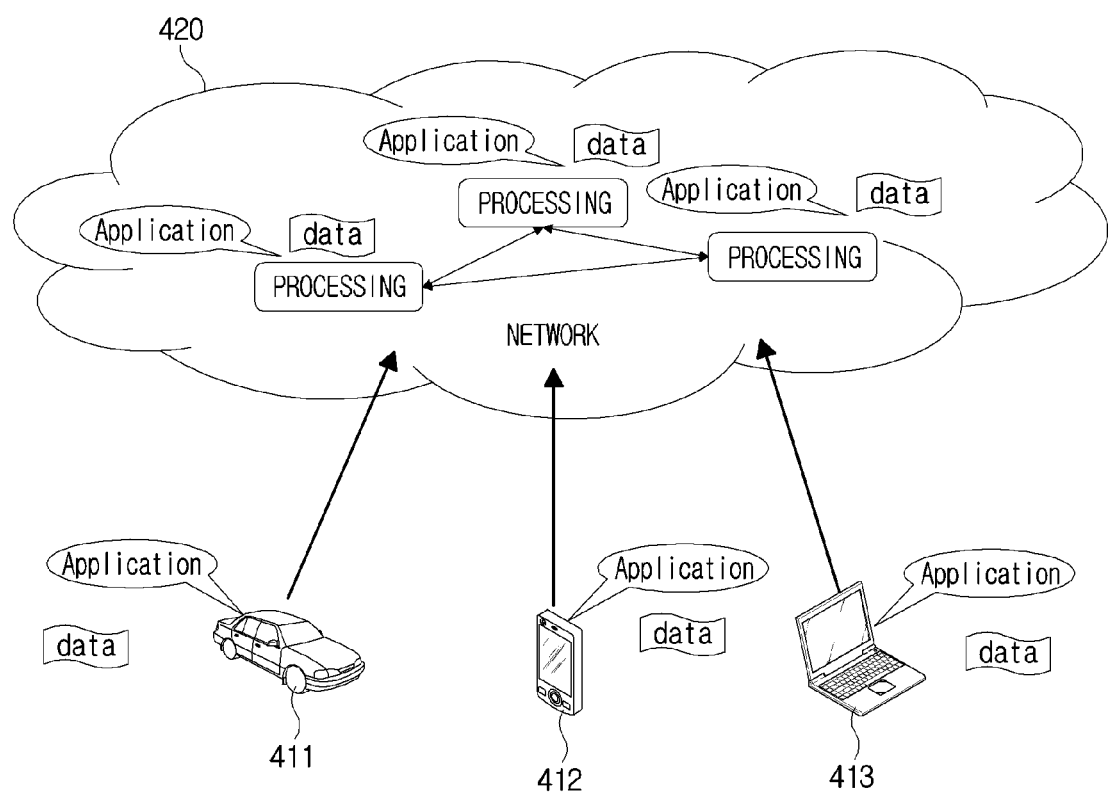

In contrast, FIG. 4B shows a method of processing data based on edging computing. At this time, for example, the devices 411, 412 and 413 may include an application and a component capable of processing other data processing. That is, the devices 411, 412 and 413 may directly process data. In addition, for example, data may be transmitted from the devices 411, 412 and 413 to the network 420. At this time, data may be processed through neighbor nodes of the network, without being transmitted to the data center. At this time, for example, the node may mean a component including an application and other apparatuses capable of processing data in the network 420 and performing data distribution processing. For example, the node may refer to at least one of a device, a shuttle or a vehicle. In addition, for example, the node may be another device, without being limited to the above-described form of the present disclosure. In addition, for example, the node may be a physical apparatus and may be a software component implemented in one apparatus, without being limited to the above-described form of the present disclosure. That is, the data of the devices 411, 412 and 413 may be distributed and processed by the device itself or by neighbor devices via the network without being transmitted to the data center. Therefore, it is possible to improve a data processing speed and improve security through distributed processing. Hereinafter, a method of controlling a moving object will be described based on the above description.

Figure 5A:
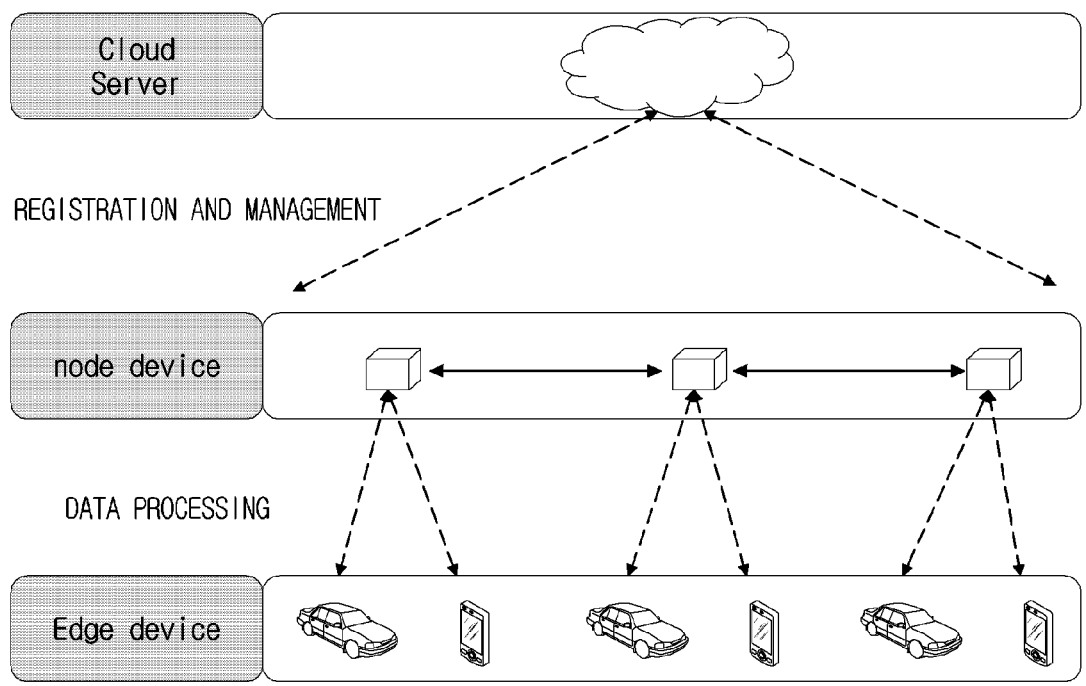
FIGS. 5A and 5B are views showing a method of performing data processing based on edge computing.
Figure 5B:
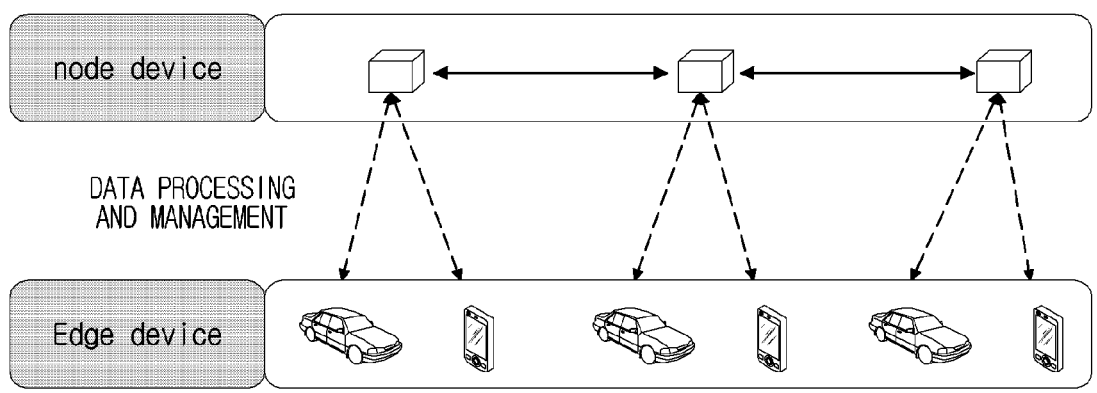

FIGS. 5A and 5B are views showing a method of performing data processing based on edge computing.

For example, referring to FIG. 5A the moving object may operate based on edge computing. At this time, for example, when the data is processed in each node based on edge computing, registration and management of each node and each edge device may be performed based on a cloud server. At this time, the edge device may include a moving object, a device or another apparatus and may include an entity for performing data processing. That is, based on the above description, the edge devices may process the data through at least one of neighbor nodes and neighbor edge devices. However, each edge device and each node may be managed through the cloud server. Therefore, it is possible to prevent the data from being processed in a centralized manner and minimize operation of a central server. At this time, for example, the information managed by the cloud server may include at least one of registration information, position information, activation information, or authority acquisition information of each node and each edge device. That is, the cloud server may control information on registration and management of each node and each edge device.

As another example, as shown in FIG. 5B, edge computing may be provided to the moving object by the neighbor nodes without the cloud. At this time, the neighbor nodes may preset at least one of an application, a program or a protocol related to data processing of the moving object. In addition, for example, the neighbor nodes may preset at least one of an application, a program or a protocol for controlling information related to registration and management of the moving object. At this time, for example, the information related to registration and management of the moving object may include at least one of registration information, position information, activation information or authority acquisition information of each node or each edge device. That is, not only data processing of each edge device but also registration and management of each edge device and each node may be performed without a cloud server. Based on the above description, data processing and moving object management may not be performed in the centralized manner but may be performed based on the neighbor devices, without being limited to the above-described form of the present disclosure.

Figure 6:
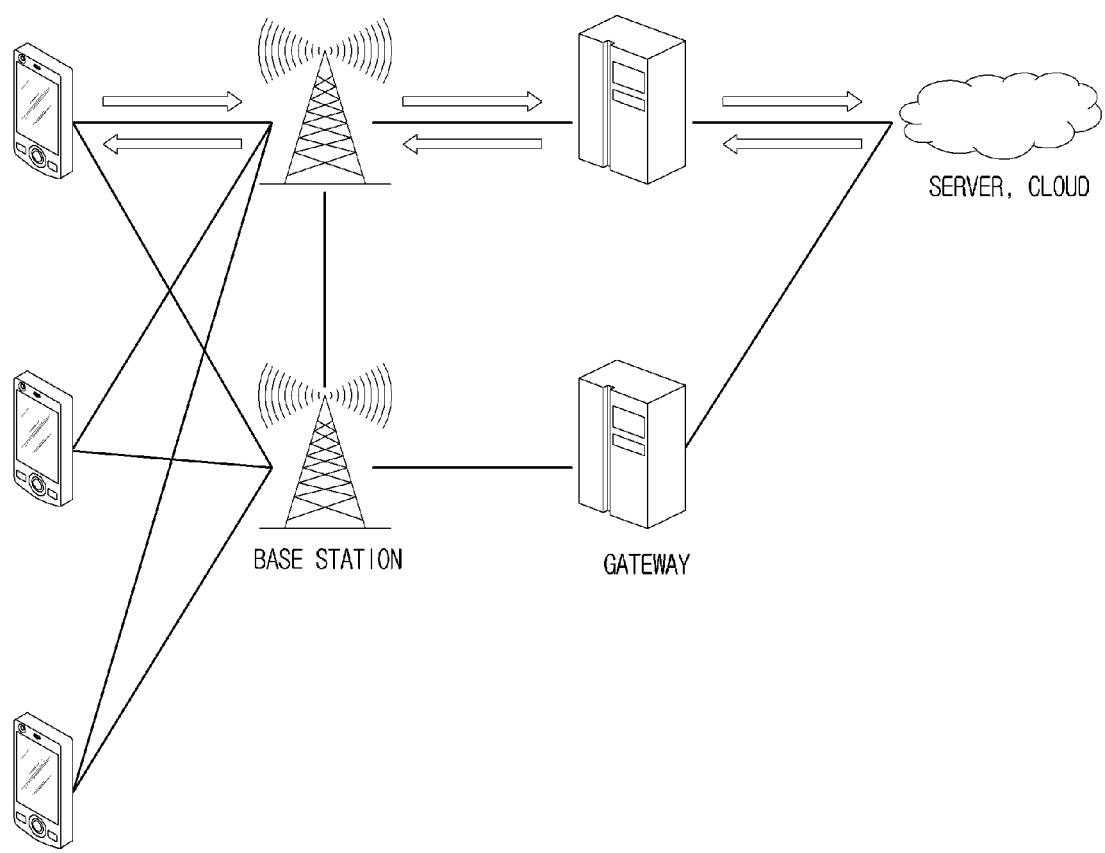
FIG. 6 is a view showing a method of, at a device, processing data based on a server.

FIG. 6 is a view showing a method of, at a device, processing data based on a server.

Referring to FIG. 6, each device may process data through connection with a base station. More specifically, each device may exchange data with the base station. At this time, for example, the base station may be a node in edge computing. That is, the case where the above-described node and the moving object exchange data may be considered. Hereinafter, for convenience of description, the base station will be described, without being limited thereto. At this time, each base station may transmit the data received from the devices to the server via a gateway. Thereafter, the server may process the data received from the base station via the gateway and transmit a response thereto to the base station via the gateway. At this time, the response may include at least one of processing information of the data requested by the device or data necessary for the moving object based on request data. Thereafter, the base station may transmit the data received from the server to the device via the gateway. The device may request data from the server as described above and receive necessary information. That is, the plurality of devices may transmit data to the server via the base station. The server may process the received data and transmit the processed data to the plurality of devices via the base station. As described above, when all devices operate based on the server, the server may process a large amount of data, and service provision may be delayed.

Figure 7:
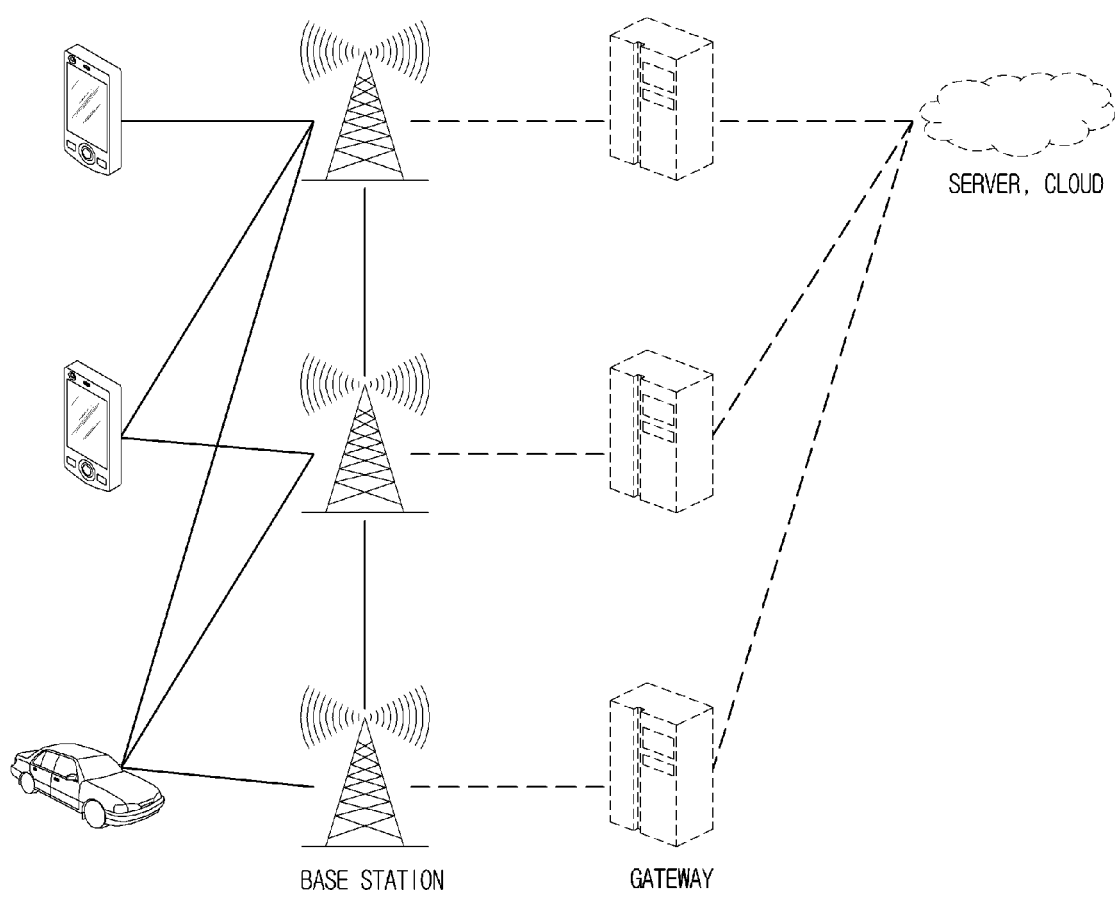
FIG. 7 is a view showing a method of, at a device, processing data based on edge computing.

FIG. 7 is a view showing a method of, at a device, processing data based on edge computing. Referring to FIG. 7, the device may process data via each base station. At this time, for example, each base station may be each node as described above. That is, the base station may not transmit the data received from the plurality of devices to the server via the gateway. In contrast, the base station may directly process the data received from the plurality of devices. In addition, for example, the base station may process information on the plurality of devices via a neighbor base station connected to the base station. That is, the data on the plurality of devices may not be processed by the server but may be processed by the neighbor nodes via the base station.

For example, as described above, the information on registration and management of each device and each base station may be transmitted to the server via the gateway. The server may receive the information on registration and management of each device and each base station and manage each device and each base station based on this. That is, although data processing is performed through the neighbor node (e.g. the base station) around the moving object, registration and management may be performed by the server. As another example, management information of each device or base station may not be transmitted to the server but may be directly managed through the neighbor node, without being limited to the above-described form of the present disclosure.

At this time, for example, as described above, when the base station directly processes data based on edge computing, a limitation on the amount of data capable of being processed based on the processing capability of the base station may be set in the base station. At this time, the base station needs to distribute and process data via neighbor base stations or neighbor devices in consideration of data processing limitations. When the base station distributes and processes the data, the base station needs to exchange data with the neighbor base stations or the other devices and thus delay may occur. In consideration of this, data distribution processing may be rapidly performed using the identity device and a service may be smoothly provided based on this.

Figure 8A:
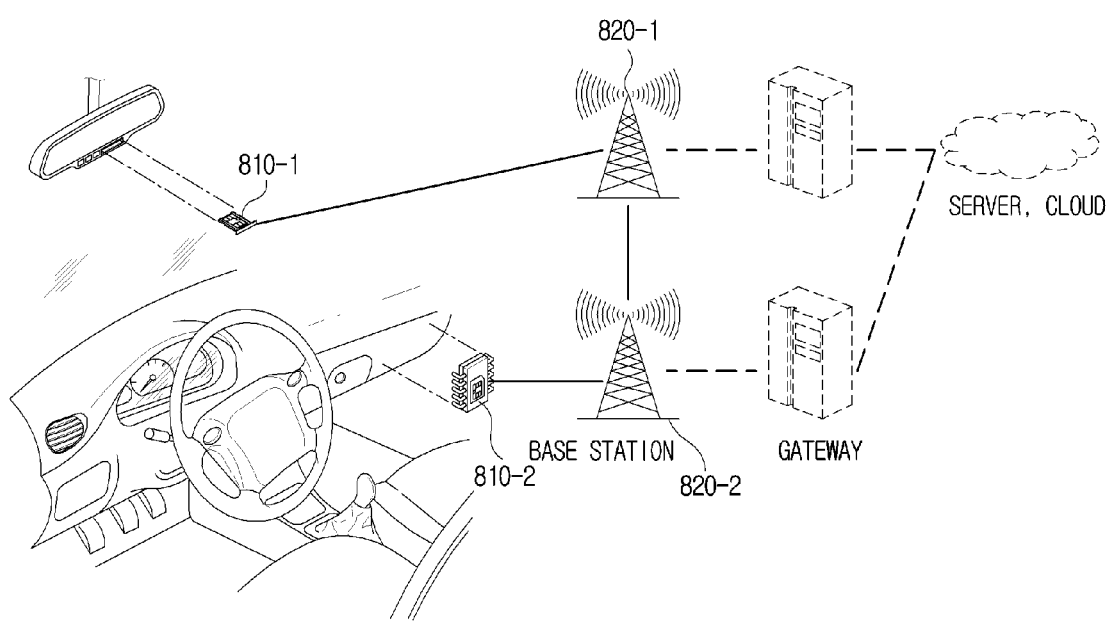
FIGS. 8A and 8B are views showing a method of providing edge computing using an identity device.
Figure 8B:
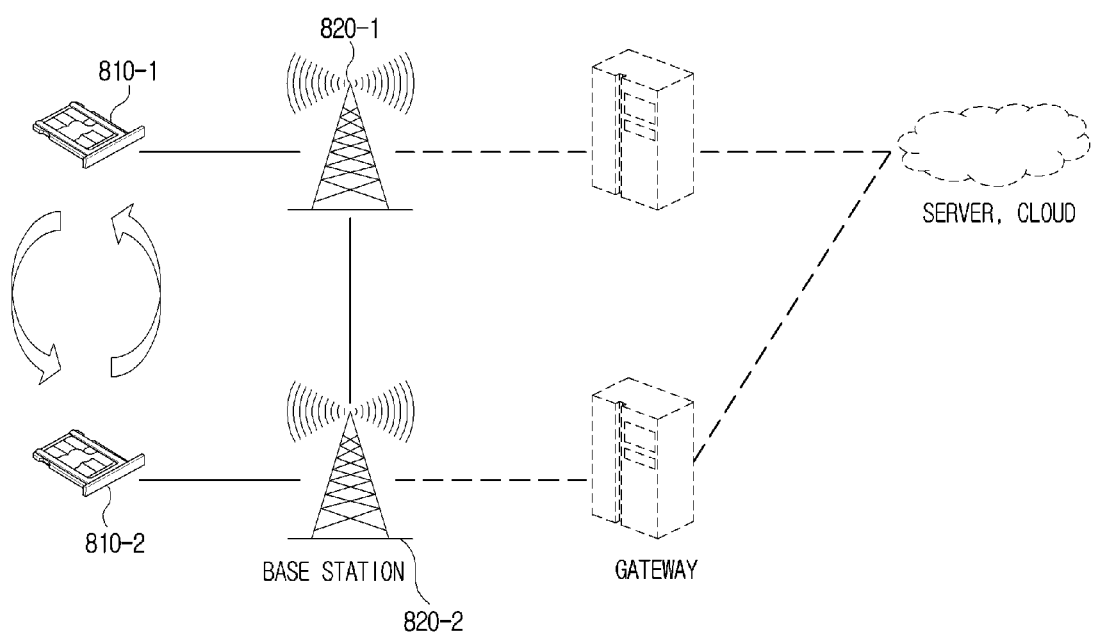

FIGS. 8A and 8B are views showing a method of providing edge computing using an identity device.

Referring to FIGS. 8A and 8B, the moving object may perform data processing for edge computing based on the identity device. More specifically, as described above, when the moving object processes data through edge computing, the moving object processes data using the neighbor nodes and thus data processing efficiency needs to increase. At this time, the moving object may transmit data to the identified base station through the identity device. For example, when a plurality of identity devices is installed (or implemented) in the moving object, the moving object may perform data exchange with the identified base station based on each identity device. For example, the moving object may separate and process a voice signal and a data signal based on the plurality of identity devices. At this time, payment for voice and payment for data may be performed based on the plurality of identity devices. In addition, for example, the moving object may transmit data and, at the same time, receive data based on the plurality of identity devices. That is, the moving object may transmit data through one identity device and receive data through another identity device.

For example, in FIG. 8A, the first identity device 810-1 may be an installed identity device and the second identity device 810-2 may be an embedded identity device, which is implemented in the moving object. However, this is only an example, all the identity devices may be installed or embedded, without being limited to the above-described form of the present disclosure. That is, a plurality of identity devices may be installed (or implemented) in the moving object, without being limited to the above-described form of the present disclosure.

At this time, the moving object may perform data communication with the identified first base station 820-1 through the first identity device 810-1. In addition, the moving object may perform data communication with the identified second base station 820-2 through the second identity device 810-2. In addition, the first base station 820-1 and the second base station 820-2 may perform data exchange via an interface therebetween. For example, the moving object may use both the data acquired based on the first identity device 810-1 and the data acquired based on the second identity device 810-2 and perform data processing based on this.

For example, the moving object may perform data processing through edge computing based on the above description. As a more detailed example, referring to FIG. 8B, data to be processed by the moving object may be generated. At this time, the moving object may transmit some of the generated data to a first base station 820-1 based on the first identity device 810-1. In addition, the moving object may transmit the remaining data to a second base station 820-2 based on the second identity device 810-2. At this time, the data may be classified according to type, which will be described below. At this time, each of the base stations 820-1 and 820-2 may process the data requested by the moving object and then transmit a response thereto to the moving object based on each of the identity devices 810-1 and 810-2. For example, as described above, the base stations 820-1 and 820-2 may directly process the data based on edge computing, without transmitting the data to the cloud. In addition, for example, the base stations 820-1 and 820-2 may exchange information necessary for data processing via an interface therebetween and perform data processing based on this. Thereafter, the moving object may receive a response message to data processing from the base stations 820-1 and 820-2. At this time, the moving object may exchange the received data through the plurality of identity devices 810-1 and 810-2. In addition, the moving object may combine and process the data information acquired from the plurality of identity devices 810-1 and 810-2 and perform data processing necessary for the moving object based on this. That is, the moving object may perform data communication with the plurality of base stations (or the plurality of nodes) using the plurality of identity devices and request data processing from the respective base stations based on this. Therefore, the moving object may perform data processing without transmitting the data to the server, thereby reducing data processing delay.

In addition, as a detailed example, the moving object may separate the data into first data and second data. However, this is only an example, without being limited to the above-described form of the present disclosure. At this time, the first data may be processed in the first base station through the first identity device. In addition, the second data may be processed in the second base station through the second identity device. The moving object may receive the processed first and second data through the first identity device and the second identity device and perform final data processing through synchronization of the data.

For example, in the case of moving object cluster traveling, the moving object may travel while maintaining a distance between the moving objects in the cluster, using at least one of information on a distance from another object in the cluster, image information of another moving object, or relative speed information of the moving object and the other moving objects. At this time, the moving object needs to process information on the other moving objects in the cluster. However, in the case of cluster traveling, the situation may be frequently changed, and it is necessary to prevent a service from being delayed in consideration of the risk of accidents. Accordingly, the moving object may not control cluster traveling using a central server but control cluster traveling through the neighbor nodes. At this time, for example, the moving object may transmit information on a distance from another moving object associated in the cluster and relative speed information to the first base station through the first identity device. At this time, the first base station may transmit information necessary for cluster traveling to the moving object based on the information received from the other moving object. More specifically, for example, the first base station may be a base station closest to the cluster in which the moving object is included. At this time, the first base station may acquire inter-vehicle distance and relative speed information from the plurality of moving objects in the cluster and determine at least one of the traveling speed and the traveling direction of each moving object based on this. Thereafter, the first base station may transmit the determined information to the moving object. In addition, the moving object may transmit image information having relatively large data to the second base station through the second identity device. At this time, the second base station may process image information necessary for cluster traveling based on the information received from the other moving object and transmit a response thereto to the moving object. More specifically, the second base station may determine the image information provided to the user of the moving object based on the image information received from the plurality of moving objects in the cluster. For example, the second base station may have large data processing capability. That is, some data in cluster traveling may be processed through a base station closest to the cluster and some data may be processed through a base station having largest data processing capability. Thereafter, the moving object may provide the necessary image to the user while maintaining cluster traveling, through the information received from the first base station based on the first identity device and the information received from the second base station based on the second identity device. That is, the moving object may display the image information to the user while maintaining the distance from the other moving object, and information thereon may be received through each identity device, combined and processed.

As another example, the moving object may divide the data in time series and transmit the data to the plurality of base stations through the plurality of identity devices. More specifically, the data to be processed in the moving object may be time series data. That is, the data to be processed in the moving object may be continuously generated. At this time, data processing resource available in the moving object may be limited and information capable of being processed through one the base station may be limited. For example, when the moving object performs data processing beyond the data processing capability of the base station, data processing delay may occur. In consideration of this, the moving object may divide the data based on a predetermined reference point of time. For example, the moving object may transmit data generated before the reference point of time to the first base station through the first identity device. In addition, the moving object may transmit data generated after the reference point of time to the second base station through the second identity device. That is, the moving object may divide each data in time series and transmit the data to each base station through each identity device. At this time, the base station may process each information and transmit a response thereto to the moving object. At this time, the moving object may combine the received information and perform final data processing. For example, the reference point of time used as a data processing criterion may be flexibly changed. In addition, when the data processing is completed in the moving object, the reference point of time may be reset and set again, without being limited to the above-described form of the present disclosure.

As another example, the moving object may divide the data based on a predetermined period. As a detailed example, the data to be processed by the moving object may be processed based on the predetermined period. As an example of information processed periodically, the moving object may acquire the position information thereof based on the predetermined period and perform data processing based on the acquired position information.

For example, the moving object may process information on different periods through each identity device. The moving object may transmit information generated based on a first period to the first base station based on the first identity device. The first base station may process the received information and provide the processed information to the moving object. In addition, the moving object may transmit information generated based on a second period to the second base station based on the second identity device. At this time, the second base station may process the received information and provide the processed information to the moving object. That is, the moving object may divide the information to be processed based on each period and process the information through different base stations, without being limited to the above-described form of the present disclosure.

As another example, the moving object may perform data processing via different networks based on each identity device. More specifically, the moving object may perform data exchange via a cellular network. In addition, for example, the moving object may perform communication with another moving object or another device based on WAVE communication, DSRC or the other communication method. That is, the moving object may use at least one of a communication network such as LTE or 5G, a Wi-Fi communication network, a WAVE communication network or a DSRC communication network as the cellular communication network. At this time, the moving object may perform data processing via a plurality of networks based on a plurality of identity devices. As described above, the data of the moving object needs to be processed based on a plurality of nodes without using the centralized manner. To this end, the moving object may transmit data to different nodes via a plurality of networks through the plurality of identity devices. At this time, different nodes may process the data received via each network and transmit the data to the moving object. The moving object may complete data processing by combining the data received through the identity devices, thereby preventing data processing delay.

As another example, the moving object may perform data processing through the plurality of identity devices according to a data security level. For example, some of the data generated in the moving object may be information related to security. For example, at least one of moving object access control code, moving object identification information, moving object authentication information or moving object authority information may be security information. However, the security information is not limited to the above-described form of the present disclosure. That is, some of the data generated in the moving object may require security maintenance and some data may not be related to security. At this time, for example, the moving object may distribute and process the data through the plurality of identity devices. For example, the moving object may transmit data requiring security maintenance to the first base station through the first identity device. At this time, the first base station may be a private base station and may have a security maintenance function. That is, the base station having the security maintenance function may directly process security related information and transmit a response thereto to the moving object. In addition, for example, the moving object may transmit information unrelated to security to the second base station based on the second identity device. At this time, the second base station is a normal base station, and the second base station may process the information unrelated to security and transmit a response thereto the moving object. That is, when data of the moving object is processed based on edge computing, the moving object may separate and process the security-related information and the security-unrelated information through the plurality of identity devices. Accordingly, it is possible to increase security while preventing data processing delay in the moving object.

Based on the above description, the moving object may perform data processing based on edge computing through the identity device. Although, for example, although the base station has been described above, the base station may be one node, without being limited to the above-described form of the present disclosure.

In addition, for example, the moving object may operate via data processed using various methods as described above. At this time, for example, operation of the moving object may be performed to provide a service to a user. The service may be information provided to the user of the moving object using data. In addition, for example, operation of the moving object may mean that at least one of setting information or status information of the moving object is changed based on data processing. That is, the moving object may operate in various forms based on the processed data, without being limited to the above-described form of the present disclosure.

At this time, for example, setting information or status information of the moving object may be provided by changing various driving environments such as the position and height of a driver's seat, the color and brightness of interior lightings, the positions and angles of the room and side-view mirrors, an inside temperature control (air conditioner and heater) range, the angle of a steering wheel, tire pressure, a transmission setting mode (normal, eco, power mode, etc.), a wireless communication connection mode (WAVE, cellular, etc.), an autonomous driving function setting variable range (speed and inter-vehicle distance, transverse speed for lane change, acceleration and deceleration, etc.) according to the driving type set in the personal device of the user. For example, the setting information or status information of the moving object may have different forms, without being limited to the above-described form of the present disclosure.

Figure 9:
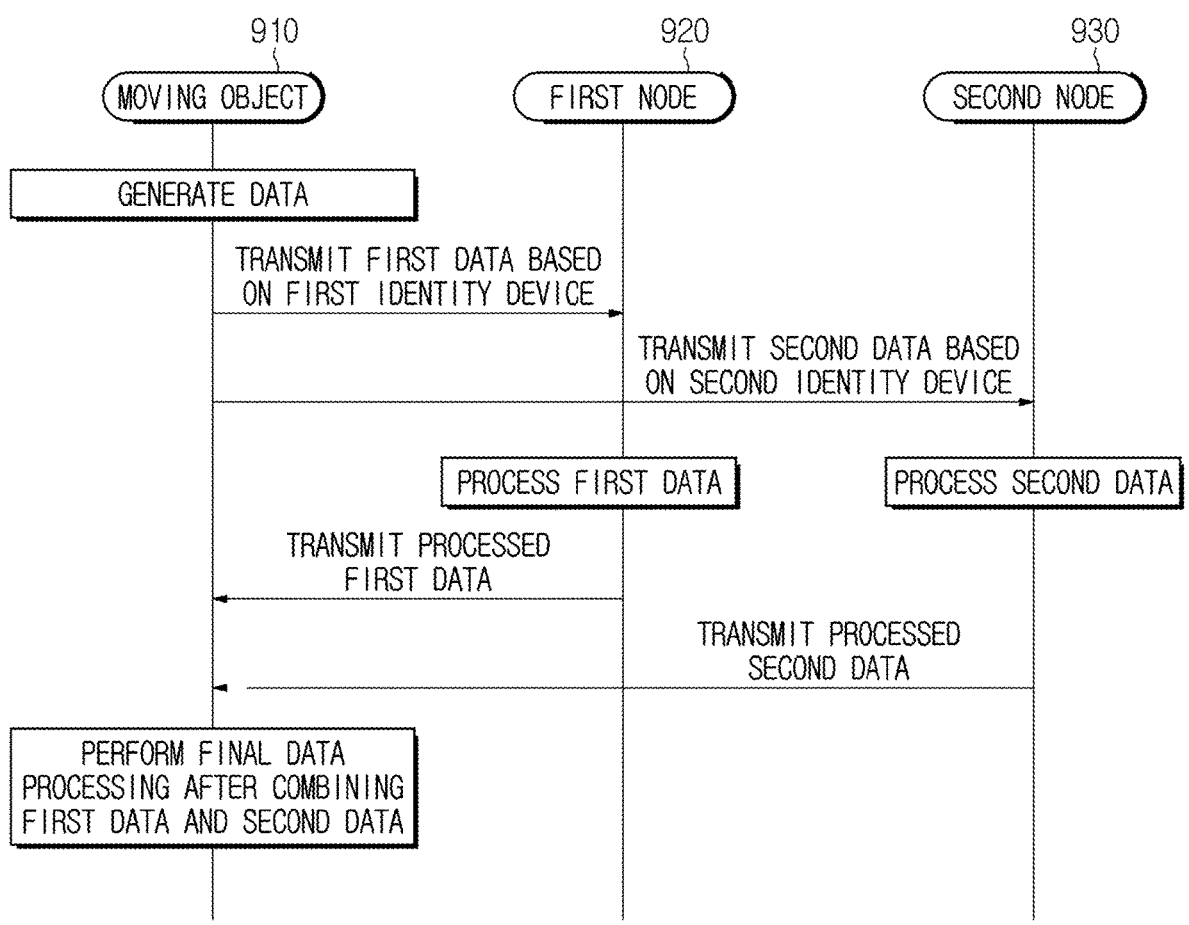
FIG. 9 is a view showing a method of, at a moving object, processing data based on edge computing.

FIG. 9 is a view showing a method of, at a moving object, processing data based on edge computing.

Referring to FIG. 9, data may be generated in a moving object 910. At this time, data may be generated, such that the moving object 910 provides a service to a user. In addition, for example, generating data may mean that data to be processed in the moving object 910 in relation to driving or traveling of the moving object 910 is generated. That is, generating data may mean that operation for data processing in the moving object 910 is necessary, without being limited to the above-described form of the present disclosure. At this time, for example, a plurality of identity devices may be installed (or implemented) in the moving object 910. At this time, a plurality of identity devices may be installed identity devices or embedded identity devices, without being limited to the above-described form of the present disclosure.

At this time, the moving object 910 may transmit first data of the generated data to a first node 920 based on a first identity device. In addition, the moving object 910 may transmit second data of the generated data to a second node 930 based on a second identity device. At this time, for example, the first node 920 and the second node 930 may be the above-described base stations, without being limited thereto.

Thereafter, the first node 920 may process the received data based on the first identity device. For example, the first node 920 may be identified based on the first identity device. In addition, the first node 920 processing the data may mean that the first node 920 generates response data to the received data. For example, the first node 920 may process information on first data based on stored information and information acquired from neighbor nodes. For example, when the first data is navigation related information, the first node 920 may determine whether the traveling route of the moving object 910 is correct based on stored map information. At this time, the first node 920 may transmit a response to the moving object 910 based on the determined information.

As a detailed example, the case where the first data is navigation related information may be considered. At this time, the first node 920 may determine whether the traveling route of the moving object 910 is correct based on prestored map information. At this time, as a detailed example, when the traveling route of the moving object 910 is consistent, the first node 920 may not transmit a response message to the moving object 910. For example, when each node processes the data received from the moving object 910 and transmits all messages to the moving object 910, the moving object 910 has a lot of data to be processed, thereby decreasing operating efficiency. In consideration of this, when the response message is necessary, the first node 920 may transmit the response message to the moving object 910, and, otherwise, transmission of the response message may be omitted. That is, the first node 920 may not unnecessarily transmit the response message when the traveling route of the moving object is consistent. In contrast, the first node 920 may transmit a response message including inconsistency information to the moving object 910 when the traveling route of the moving object is not consistent. At this time, when the moving object 910 receives the response message from the first node 920, the moving object 910 may control the traveling route based on the received message and messages received from the other nodes. Accordingly, the moving object 910 may perform data distribution processing.

In addition, for example, the second node 930 may process the received data based on a second identity device. For example, the second node 930 may be identified based on the second identity device. In addition, the second node 930 processing the data may mean that the second node 930 generates response data to the received data. For example, the second node 930 may process information on second data based on stored information and information acquired from neighbor nodes. For example, when the second data is information related to the position of the moving object, the second node 930 may determine the position of the moving object based on the information received from the neighbor nodes and the moving object. At this time, the second node 930 may transmit a response to the moving object 910 based on the determined information. Thereafter, the moving object 910 may combine the received first data and the second data and finally perform data processing. At this time, for example, the moving object 910 may provide a final service to the user of the moving object through the received information as described above, without being limited to the above-described form of the present disclosure.

In the above-described forms of the present disclosure, the data is transmitted to each node through the first identity device and the second identity device, thereby performing data processing. However, for example, as described above, the identity device may be implemented in hardware or software. Therefore, data processing may be performed based on one identity device. For example, one identity device may transmit some of the data to the first node such that the data is processed and transmit some of the data to the second node such that the data is processed. Therefore, the above-described operation may be performed, without being limited thereto. In addition, for example, one identity device may perform the functions of the first identity device and the second identity device through a virtual identity device. At this time, the virtual identity device may be implemented in software and has a function for operating a plurality of identity devices in one identity device configured in hardware. That is, a method of performing data processing based on a plurality of identity devices is equally applicable to one identity device, without being limited to the above-described form of the present disclosure.

Figure 10:
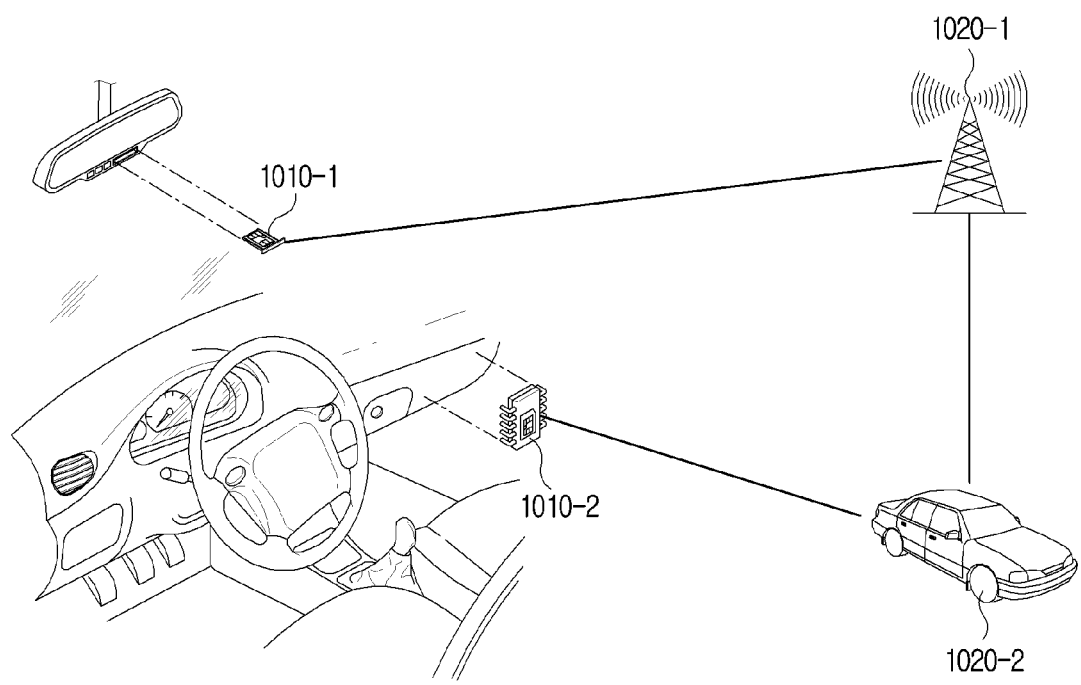
FIG. 10 is a view showing a method of providing edge computing using an identity device through a plurality of apparatuses.

FIG. 10 is a view showing a method of processing data based on edge computing through a plurality of apparatuses.

The moving object may perform data processing not only through the base station but also through another moving object. More specifically, when data to be processed is generated in the moving object, the moving object may transmit the data to be processed to a neighbor base station (or a neighbor node) and a neighbor moving object and then receive a response thereto, thereby finally completing data processing. At this time, for example, the moving object may distinguish information to be transmitted to the base station and another moving object through the identity device. When the data to be processed is generated in the moving object, the moving object may transmit data to neighbor moving objects through the first identity device. In addition, the moving object may transmit the data to the neighbor base station through the second identity device. That is, a specific identity device among the plurality of identity devices may perform data exchange with another moving object for edge computing. In addition, another identity device among the plurality of identity devices may perform data exchange with another base station for edge computing.

As a more detailed example, referring to FIG. 10, the moving object may perform data communication with a base station 1020-1 through a first identity device 1010-1. At this time, when data to be processed is generated in the moving object, the moving object may divide the data into data to be requested from the base station 1020-1 and data to be requested from another moving object 1020-2. For example, first data may be transmitted to the base station 1020-1. In addition, for example, second data may be transmitted to another moving object 1020-2, without being limited to the above-described form of the present disclosure. At this time, the moving object may transmit the first data to the base station 1020-1 through the first identity device 1010-1. At this time, the base station may process the received first data and transmit a response message thereto to the moving object based on the first identity device 1010-1. In addition, the moving object may transmit the second data to another moving object 1020-2 through the second identity device 1010-2. At this time, another moving object 1020-2 may process the received second data and transmit a response thereto to the moving object. The moving object may finally perform data processing using the received first and second data.

That is, the moving object may perform data exchange through different identity devices for each type of neighbor device. Therefore, edge computing may be performed to improve a data processing speed, without being limited to the above-described form of the present disclosure.

Figure 11:
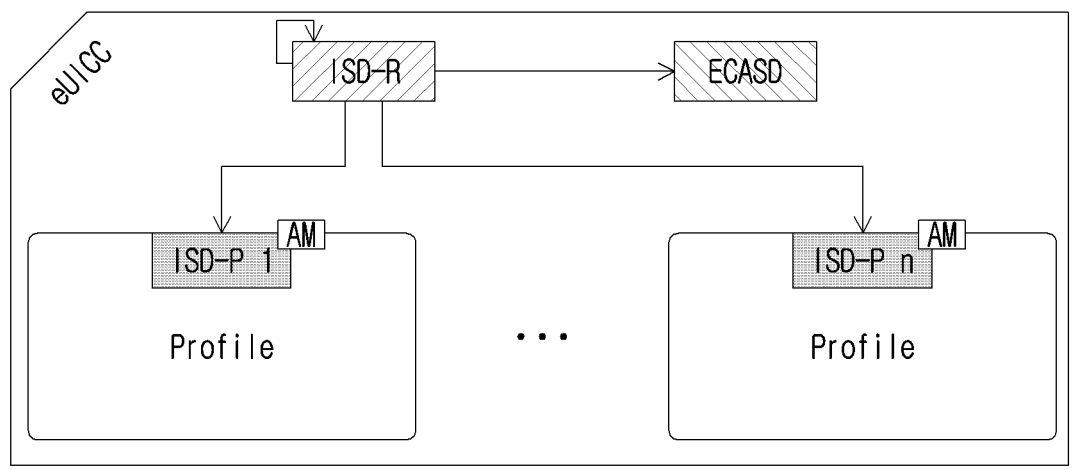
FIG. 11 is a view showing an embedded identity device.

In addition, for example, in association with FIG. 10, the function of each of the first identity device and the second identity device may be performed based on one identity device. At this time, as described above, the identity device may be implemented in hardware or software. Based on this, the moving object may perform communication with the base station and another moving object based on one identity device. For example, one identity device may perform the functions of the first identity device and the second identity device through a virtual identity device. At this time, the virtual identity device may be implemented in software and has a function for operating a plurality of identity devices in one identity device configured in hardware. That is, one identity device may perform communication by distinguishing a plurality of apparatuses based on a plurality of identity devices as described above, without being limited to the above-described form of the present disclosure. FIG. 11 is a view showing an operating method based on an embedded identity device. For example, as described above, the embedded identity device or an identity device may store profile information as shown in FIG. 11. At this time, for example, the profile information may be user related information or information stored for use of the moving object. At this time, for example, in consideration of security of the moving object and supplementation of the identity device, a component accessible to the profile and a component for performing authentication with the moving object may be distinguished. That is, the component accessible to the profile in the embedded identity device may acquire information on control of the moving object from the profile and transmit the information to the component for performing authentication with the moving object. In addition, for example, operation based on a component other than the component disclosed in FIG. 11 is possible, without being limited to the above-described form of the present disclosure.

Figure 12:
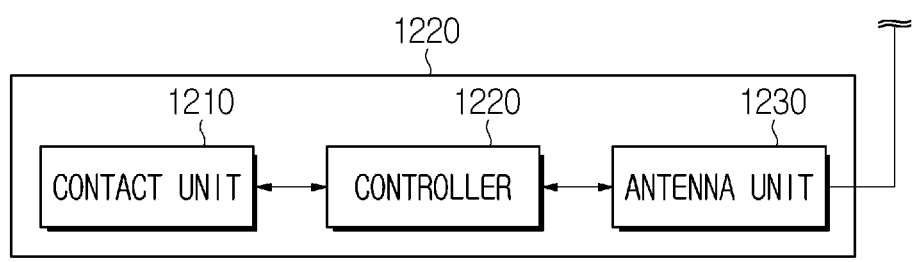
FIG. 12 is a view showing the configuration of an identity device.

FIG. 12 is a view showing an identity device. Referring to FIG. 12, the identity device 1200 may include a contact unit 1210 which may be brought into contact with a moving object or another device for recognition. In addition, for example, the identity device 1200 may include a controller 1220 for controlling and managing operation based on the identity device 1200. In addition, the identity device 1200 may include an antenna unit 1230 for performing communication with another device and exchanging data. At this time, for example, the controller 1220 may manage the contact unit 1210 and the antenna unit 1230 and may control the other components. In addition, the above-described components may be implemented in hardware or software. That is, the above-described components may be physically included in the identity device 1200 or may be a software component operating based on the operation and function of the identity device 1200, without being limited to the above-described form of the present disclosure.

Figure 13:
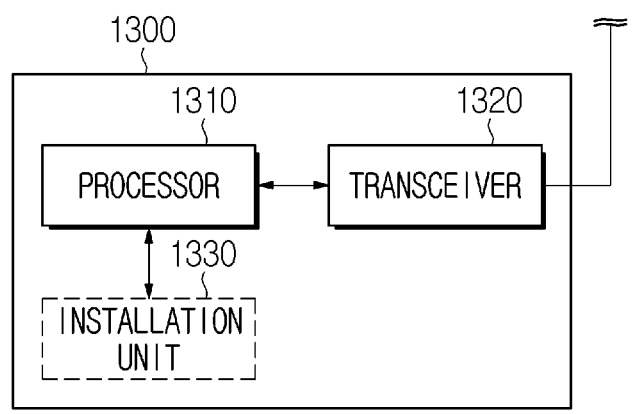
FIG. 13 is a view showing the configuration of an apparatus.

FIG. 13 is a view showing the configuration of an apparatus. Referring to FIG. 13, the apparatus may include at least one of the above-described moving object, a device, a sever or an RSU. That is, the apparatus may communicate or cooperate with another device, without being limited to the above-described form of the present disclosure. For example, the apparatus 1300 may include a processor 1310 and a transceiver 1320 for the above-described operation. That is, the apparatus may include a component necessary to perform communication with anther apparatus. In addition, for example, the apparatus may include components other than the above-described components. That is, the apparatus includes the above-described components in order to perform communication with another device, without being limited thereto, and may operate based on the foregoing.

In addition, for example, the apparatus 1300 may further include an installation unit 1330 in which another device (e.g., the identity device) is installed. At this time, the installation unit may be included in the moving object in the form shown in FIGS. 2a to 2d. For example, the installation unit 1330 may be implemented in any one area of the front side of the driver's seat in the moving object. In addition, for example, the installation unit 1330 may be implemented in the passenger seat kit inside the moving object. In addition, for example, the installation unit 1330 may be implemented in the mirror inside the moving object. In addition, for example, the installation unit 1330 may be implemented in the moving object in the form of a cradle or a paddle, as described above. That is, the apparatus 1300 may further include the installation unit 1330 for recognizing the identity device as another device, as described above, recognize another device based on the same, and perform authentication. For example, the installation unit 1330 may be implemented in the moving object. At this time, the installation unit 1330 may be implemented in the apparatus 1300 as a physical component. As another example, the installation unit 1330 may be implemented in the apparatus 1300 as a software component. At this time, when the installation unit 1330 is implemented in the apparatus 1300, the identity device may be implemented in the apparatus 1300 as a physical or software component as described above, without being limited to the above-described form of the present disclosure.

According to the present disclosure, it is possible to provide a method and apparatus for operating a moving object based on edge computing.

According to the present disclosure, it is possible to provide a method and apparatus for operating a moving object through an identity device based on edge computing.

According to the present disclosure, it is possible to provide a method and apparatus for performing edge computing in a moving object based on a plurality of identity devices.

The technical problems solved by the present disclosure are not limited to the above technical problems and other technical problems which are not described herein will become apparent to those skilled in the art from the above description.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various forms of the present disclosure are not a list of all possible combinations and are intended to describe representative aspects of the present disclosure, and the matters described in the various forms may be applied independently or in combination of two or more.

In addition, various forms of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various forms of the present disclosure to be executed on an apparatus or a computer, a non-transitory computer-readable medium having such software or commands stored thereon and executable on the apparatus or the computer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of operating a moving object having a plurality of identity devices, the method comprising:
generating a plurality of data in the moving object, the data configured to be processed in relation to at least one of driving control or settings of the moving object;
transmitting first data of the plurality of data to a first node through a first identity device of the moving object and transmitting second data of the plurality of data to a second node through a second identity device of the moving object;
receiving the first data of the plurality of data from the first node and receiving the second data of the plurality of data from the second node; and
operating the moving object based on receiving the first data of the plurality of data and receiving the second data of the plurality of data,
wherein a data processing capability of the second node is larger than a data processing capability of the first node, wherein transmitting the first data and the second data comprises transferring the first data and the second data, which are classified according to a type of data, to the first node and the second node, respectively, wherein receiving the first data and the second data comprises acquiring the first data processed in the first node and acquiring the second data processed in the second node, and wherein operating the moving object comprises:
combining the first data and the second data to generate combined data, and
operating the moving object based on the combined data.

2. The method according to claim 1, wherein each of the first identity device and the second identity device includes unique identification information.

3. The method according to claim 2, wherein the method further comprises:
determining the first node based on the unique identification information of the first identity device; and
determining the second node based on the unique identification information of the second identity device.

4. The method according to claim 3, wherein the receiving of the first data and the second data includes:
processing, by a first base station corresponding to the first node, the first data; and
processing, by a second base station corresponding to the second node, the second data.

5. The method according to claim 4, wherein the method further comprises:
performing, by the first base station and the second base station, registration or management of the moving object via a cloud.

6. The method according to claim 1, wherein the operation of the moving object includes:
changing at least one of setting information or status information of the moving object.

7. The method according to claim 6, wherein the setting information or the status information includes at least one of a position of a driver's seat, a height of the driver's seat, a color of an interior lighting, brightness of the interior lighting, a position of a room mirror, an angle of the room mirror, a position of a side-view mirror, an angle of the side-view mirror, an inside temperature, an angle of a steering wheel, tire pressure, an autonomous driving function setting variable, a transmission setting mode, a dashboard mode, navigation settings, content settings, or a wireless communication connection mode.

8. The method according to claim 3,
wherein the unique identification information of the first identity device is identification information of a type indicating a base station, and
wherein the unique identification information of the second identity device is identification information of a type indicating the moving object.

9. The method according to claim 1,
wherein the first data of the plurality of data is generated before a first point of time, and
wherein the second data of the plurality of data is generated after the first point of time.

10. The method according to claim 2,
wherein the first data of the plurality of data is generated based on a first period, and
wherein the second data of the plurality of data is generated based on a second period.

11. The method according to claim 1,
wherein the first data of the plurality of data is processed via a first network, and
wherein the second data of the plurality of data is processed via a second network.

12. The method according to claim 11,
wherein the first data of the plurality of data is security-related data, and
wherein the second data of the plurality of data is security-unrelated data.

13. The method according to claim 2, wherein the method further comprises:
when the first data of the plurality of corresponds to navigation of the moving object, determining, by the first node, whether a traveling route of the moving object is consistent based on prestored map information.

14. The method according to claim 13, wherein the determination by the first node includes:
when the traveling route of the moving object is determined to be consistent based on the prestored map information, not transmitting a response message to the moving object; and
when the traveling route of the moving object is determined not to be consistent based on the prestored map information, transmitting the response message to the moving object as the first data processed in the first node.

15. The method according to claim 2,
wherein the first identity device is an installed identity device, and
wherein the second identity device is an embedded identity device.

16. The method according to claim 2, wherein the method further comprises:
installing two or more identity devices in the moving object.

17. A moving object operating by applying an identity device, the moving object comprising:
a transceiver configured to transmit and receive a signal; and
a processor configured to:
control the transceiver;
detect generation of data, the data configured to be processed in relation to at least one of driving control or settings of the moving object;
transmit first data of a plurality of data to a first node through a first identity device of the moving object and transmit second data of the plurality of data to a second node through a second identity device of the moving object;
receive the first data of the plurality of data from the first node and receive the second data of the plurality of data from the second node; and
operate based on the first data of the plurality of data and the second data of the plurality of data,
wherein a data processing capability of the second node is larger than a data processing capability of the first node,
wherein transmitting the first data and the second data comprises transferring the first data and the second data, which are classified according to a type of data, to the first node and the second node, respectively,
wherein receiving the first data and the second data comprises acquiring the first data processed in the first node and acquiring the second data processed in the second node, and wherein operating the moving object comprises:
  combining the first data and the second data to generate combined data, and
  operating the moving object based on the combined data.

18. The moving object according to claim 17,
wherein the first data of the plurality of data is generated before a first point of time, and
wherein the second data of the plurality of data is generated after the first point of time.

19. The moving object according to claim 17,
wherein the first data of the plurality of data is generated based on a first period, and
wherein the second data of the plurality of data is generated based on a second period.

20. An edge computing system comprising:
a plurality of nodes; and
a moving object configured to:
  detect generation of data, the data configured to be processed in relation to at least one of driving control or settings of the moving object;
  transmit first data of a plurality of data to a first node through a first identity device of the moving object and transmit second data of the plurality of data to a second node through a second identity device of the moving object;
  receive the first data of the plurality of data from the first node and receive a second data of the plurality of data from the second node; and
  operate based on the first data of the plurality of data and the second data of the plurality of data,
wherein a data processing capability of the second node is larger than a data processing capability of the first node,
wherein transmitting the first data and the second data comprises transferring the first data and the second data, which are classified according to a type of data, to the first node and the second node, respectively,
wherein receiving the first data and the second data comprises acquiring the first data processed in the first node and acquiring the second data processed in the second node, and
wherein operating the moving object comprises:
  combining the first data and the second data to generate combined data, and
  operating the moving object based on the combined data.

* * * * *